(12) United States Patent
Kennedy (10) Patent No.: US 7,047,699 B2
(45) Date of Patent: May 23, 2006

(54) SANDWICH PLATE STEPPED RISERS

(75) Inventor: Stephen J Kennedy, Canada (CA)

(73) Assignee: Intelligent Engineering (Bahamas) Limited, Nassau (BS)

( * ) Notice: Subject to any disclaimer, the term of this patent is extended or adjusted under 35 U.S.C. 154(b) by 11 days.

(21) Appl. No.: 10/398,643

(22) PCT Filed: Sep. 13, 2001

(86) PCT No.: PCT/GB01/04127

§ 371 (c)(1),
(2), (4) Date: Jul. 29, 2003

(87) PCT Pub. No.: WO02/33200

PCT Pub. Date: Apr. 25, 2002

(65) Prior Publication Data

US 2004/0010981 A1    Jan. 22, 2004

(51) Int. Cl.
*B32B 15/06* (2006.01)

(52) U.S. Cl. .............. 52/184; 52/181; 52/182; 52/8

(58) Field of Classification Search .......... 52/181, 52/182, 184, 188, 6, 8, 900; 428/209, 457, 428/458
See application file for complete search history.

(56) References Cited

U.S. PATENT DOCUMENTS

| 1,452,467 | A |  | 4/1923 | Lambert |  |
|---|---|---|---|---|---|
| 4,893,442 | A | * | 1/1990 | Graham et al. | 52/184 |
| 5,014,475 | A | * | 5/1991 | Anderson et al. | 52/191 |
| 5,778,813 | A |  | 7/1998 | Kennedy |  |
| 2002/0053178 | A1 | * | 5/2002 | Kergen | 52/650.1 |
| 2002/0187320 | A1 | * | 12/2002 | Kennedy | 428/209 |
| 2004/0067373 | A1 | * | 4/2004 | Kennedy | 428/457 |

FOREIGN PATENT DOCUMENTS

| EP | 0 493 123 | 7/1992 |
| EP | 0 540 804 | 5/1993 |
| FR | 2 259 801 | 8/1975 |
| GB | 2 030 192 | 4/1980 |
| GB | 2 337 022 | 11/1999 |
| GB | 2 355 957 | 5/2001 |
| JP | 4-353440 | 12/1992 |
| JP | 4-353447 | 12/1992 |
| JP | 5-345385 | 12/1993 |
| JP | 6-39962 | 2/1994 |
| JP | 9-1726 | 1/1997 |

OTHER PUBLICATIONS

Database WPI, Section Ch, Week 199433, Derwent Publications Ltd., London, GB; Class A88, AN 1994-269120 ###Accession No. XP-002181561 abstract for JP 06 198802 A, (Jul. 19, 1994).

* cited by examiner

*Primary Examiner*—Basil Katcheves
(74) *Attorney, Agent, or Firm*—Darby & Darby (57) ABSTRACT

A two-tired seating riser for a sports stadium comprises upper and lower metal plates bonded together by a solid elastomer core. The elastomer core has different thicknesses in the treads and rises. The lower tread has a lip portion in which the metal plates are flared to facilitate alignment with the riser below.

15 Claims, 6 Drawing Sheets

SANDWICH PLATE STEPPED RISERS

The present invention relates to stepped risers, particularly seating risers for sports stadia and other entertainment venues.

To increase the revenue from sporting and other events, it is desirable to maximize the number of spectators that can be accommodated in a sports stadium or other venue. To do this it is necessary to provide additional tiers of seats, often resulting in structures in which a significant portion of the upper bowl seating cantilevers over other parts of the structure. Accordingly, the weight of risers supporting such seating should be minimized to reduce the size and cost of the supporting structure. To reduce transient and resonant vibrations associated with sporting and entertainment events the risers must be stiff, have sufficient mass, or be constructed with materials having good damping characteristics.

Existing designs of seating risers are made of prestressed or precast concrete or steel. Known riser sections are generally constructed from concrete as it allows for long clear spans between rakers (typically 12,200 mm) with reasonable vibration control since concrete has a damping coefficient of 0.2, good fire resistance and relatively low maintenance cost. The major disadvantage of concrete construction is that the riser section is heavy, e.g. about 10T for a two tier riser, with self weight (deadload) equal to the design superimposed live load due to use and occupancy. It is therefore necessary to provide heavier, stronger, stiffer and more costly superstructure and foundations to support the riser sections, especially for large cantilever seating sections.

To minimise self weight, and hence reduce the cost of the superstructure and foundations, the riser sections may be constructed with folded steel plates that are supported by intermediate rakers and a secondary steel framework. Typically the maximum span for this type of construction is approximately 6100 mm and the self weight about 40% of an equivalent concrete structure. However, steel risers are more susceptible to sound and vibration problems, having a damping coefficient of 0.1, and have additional costs associated with the fabrication and erection of the intermediate rakers and secondary steel framework.

Accordingly it is an aim of the present invention to provide an improved seating riser, for example that is lighter, simpler in construction and/or better damped.

According to the present invention, there is provided a stepped riser comprising a sandwich structure having upper and lower metal plates and an intermediate layer of a plastics or polymer material bonded to said metal plates so as to transfer shear forces therebetween.

The sandwich structure plates used in forming the stepped riser have increased stiffness as compared to steel plates of comparable thickness and avoid or reduce the need to provide stiffening elements. This results in a considerably simpler structure with fewer welds or none leading to both simplified manufacture and a reduction in the area vulnerable to fatigue or corrosion. Further details of sandwich plate structures suitable for use in the present invention can be found in U.S. Pat. No. 5,778,813 and British Patent Application GB-A-2 337 022. The intermediate layer may also be a composite core as described in British Patent Application No. 9926333.7.

The outer upper and lower metal plates preferably have a thickness in the range of from 2 to 10 mm and the intermediate layer in thickness in the range of from 10 to 100 mm. To provide space for seating, the run (depth) of the risers is preferably in the range of from 600 to 1200 mm. The slope of the risers is preferably in range of from 20° to 45°. The outer metal plates are preferably parallel but need not be.

The present invention provides a riser having one or more tiers (steps), typically two, and offers unique advantages over traditional types of construction by providing long clear spans, e.g. of 6 to 20 m in length, that are comparable to prestressed or precast concrete while weighing approximately 70% less and by providing a less complex structure which does not need the secondary steel work associated with all-steel risers of the same span. The plastics or polymer (e.g. polyurethane elastomer) core acts as a natural damper, reducing vibrations (damping coefficient for risers according to the invention can be between 0.4 and 0.5) and provides excellent sound insulation; improving both comfort and safety. In addition, the construction provided by the present invention allows for the use of dissimilar metals without welding. Therefore corrosion-resistant stainless steel, that reduces maintenance, improves life span and maintains its visual attractiveness, can be used for the wearing exposed surface in conjunction with less expensive structural steel for the underside surface, that can be welded or bolted through T-stub sections which are bolted to raker beams. The structured steel may be galvanised or coated with epoxy or zinc rich paint to provide the appropriate corrosion protection.

The riser sections can be fabricated under controlled conditions to provide a quality structural section with good dimensional accuracy. The connections for railings, seating and longitudinal joint seals can be similar to those for prestressed or precast concrete. Drip lips and interlocking longitudinal seams can be included to facilitate water runoff and erection, and to limit horizontal deflections of the risers.

Integral guides, interlocking and drip extended riser plates as well as bolted connections in embodiments of the invention simplify placement and installation of the riser. Two-tier risers are aligned with the lower section via guide plates and bolted to the raker beams. Additional bolts provided along the guide edge, e.g. at every 1000 mm, prevent de-bonding if one of the two plates is accidentally pulled open during transportation or installation.

Alternatively, the sandwich plate risers may be welded closed to completely encase the plastic core. This simplifies fabrication of shaped sections, e.g. wedge shaped sections at the ends of a bowl, by eliminating the need for more complex adjustable jigs to form an enclosure for casting of the plastic core. In addition, this type of section, without any exposed plastic along the edges, has excellent fire resistance and may be used in parts of the stadium that must be designed to resist fires.

A riser according to the present invention can be designed to meet relevant serviceability criteria and construction constraints related to vibration and deflection control, and plate handling. The strength and stiffness of the treads and risers can be tailored to improve performance while minimizing cost and weight by specifying two different core thicknesses. The resulting structure is light, stiff and, with the core's inherent dampening characteristics, provides improved structural and vibration response performance over risers built with stiffened steel plates and rolled sections (secondary steel work) or those built with prestressed concrete.

The present invention will be described further below with reference to the following description of an exemplary embodiment and the accompanying schematic drawings, in which.

In the various drawings, like parts are denoted by like reference numerals.

Figure 1:
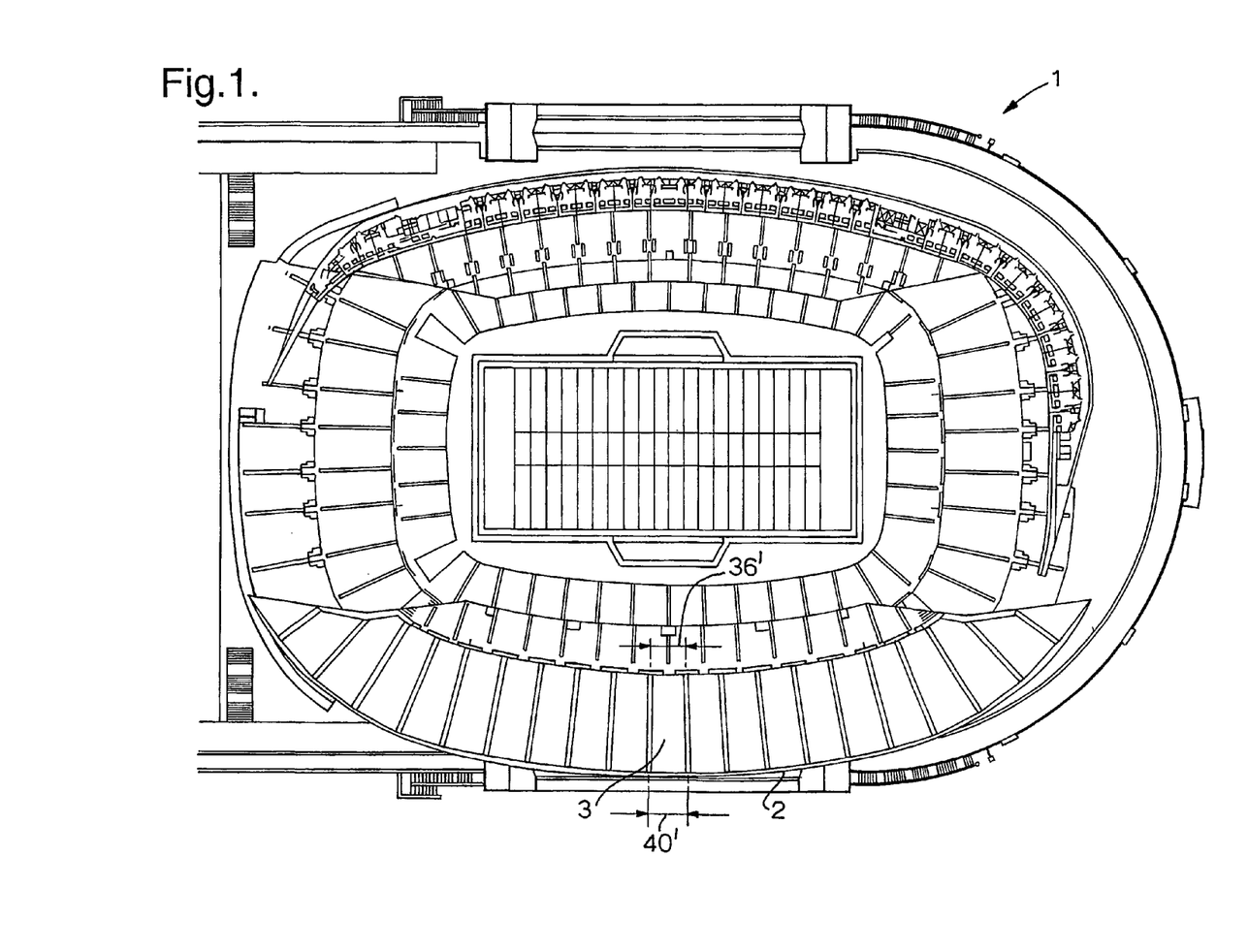
FIG. 1 is a plan view of a sports stadium in which the seating riser of the present invention may be used.
Figure 2:
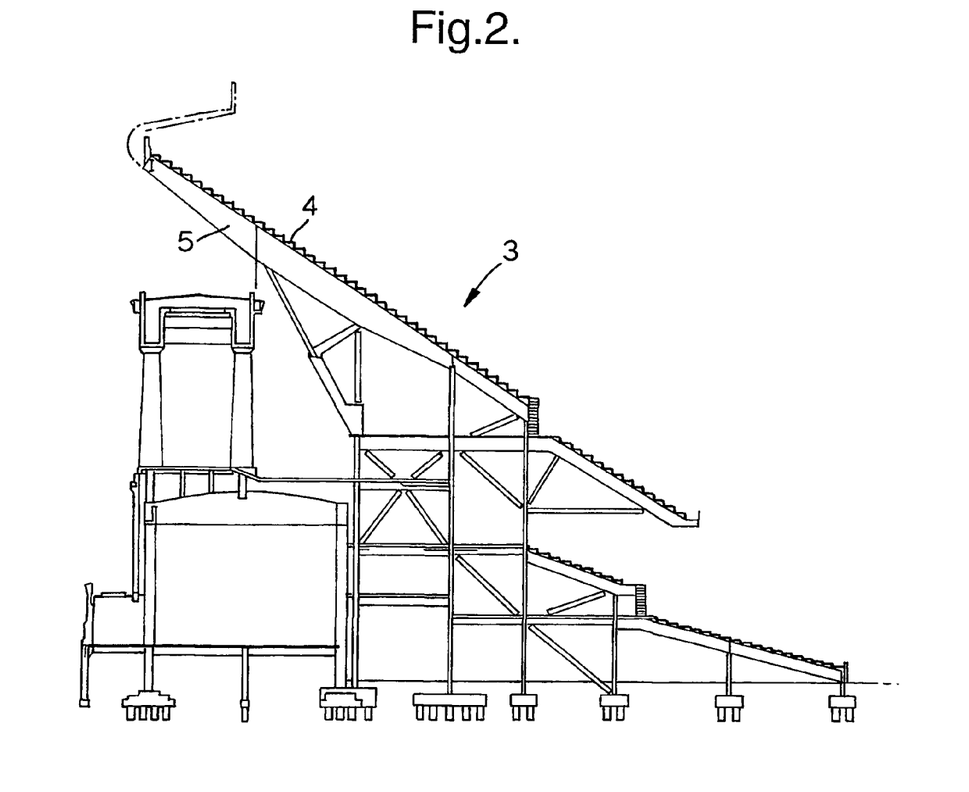
FIG. 2 is a cross-sectional view of section of the stadium of FIG. 1 in which seating risers according to the present invention are used.

FIG. 1 shows a sports stadium 1 having on one side an elevated stand (upper bowl) 2 which includes raked seating sections 3. These seating sections are approximately rectangular at midfield and flare outwards, at the edges of the stand so as to be tapezoidal (wedge-shaped) in plan. The seating sections 3 typically have a width of about 36 feet (about 11 m) at the lower end and about 40 feet (about 12 ½ m) at the upper or outer edge. A cross-section through such a seating section is shown in FIG. 2. As can there be seen, the upper bowl of the stand consists of a series of seating risers 4 mounted on raker beams 5 which cantilever over other parts of the stadium. Seating risers may also be placed on several levels to maximise the number of seats with optimum viewing position.

Figure 3:
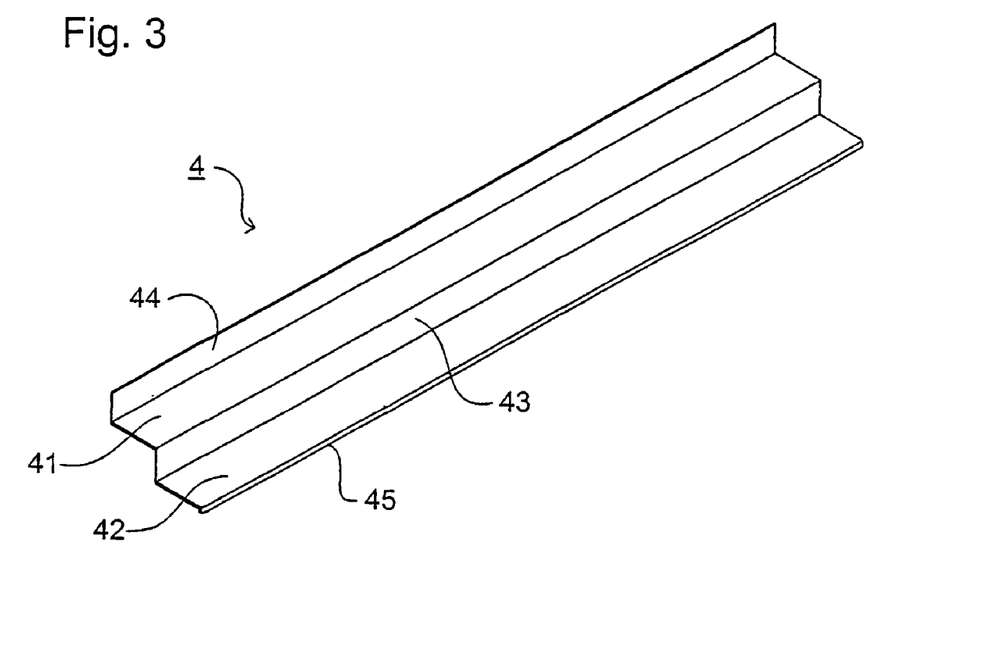
FIG. 3 is perspective view of a seating riser according to a first embodiment of the present invention that is constructed without welding.

A two-tier riser 4 is shown in perspective in FIG. 3 and comprises upper and lower treads 41, 42 joined by first rise 43. Second rise 44 projects upwardly from the back edge of first tread 41 and a lip 45 projects downwardly from the front edge of tread 42.

Figure 4:
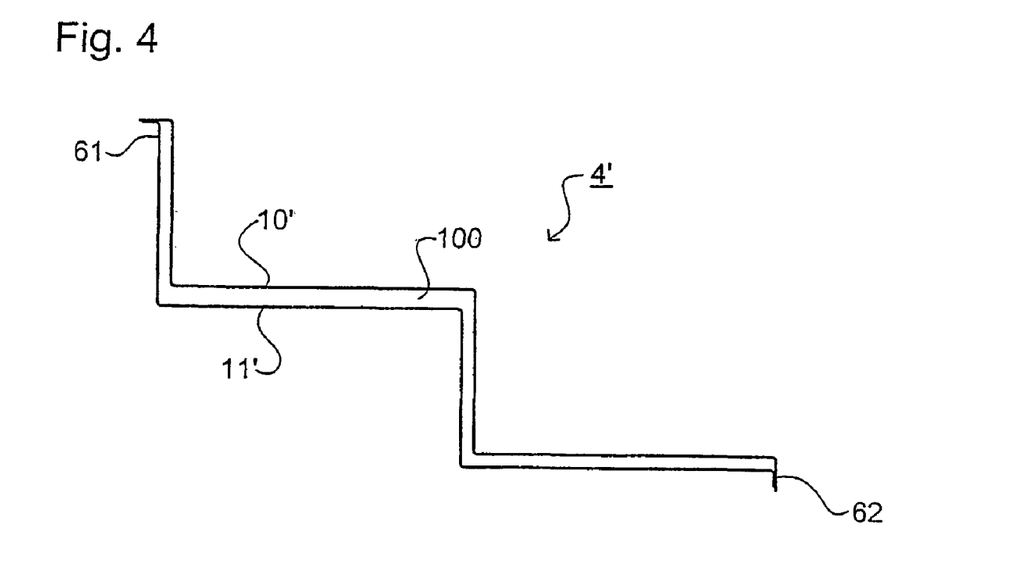
FIG. 4 is an end view of a welded seating riser according to a second embodiment of the present invention.

The two-tier riser can be formed by two folded plates 10, 11, for example of thickness 4 mm, and a plastic core 12, e.g. of structural polyurethane elastomer, with a thickness of 40 mm, for example, in the treads and 20 mm, for example, in the rise as illustrated in FIG. 4. An 11 m riser weighs approximately 3T or 30 pounds per square foot (about 145 kgm$^{-2}$) of projected horizontal area. The steel sections can be made with a single rolled plate that requires limited cutting to size the plate prior to folding or roll forming. The folded plates are placed into a steel mould (jig) with appropriate spacers (e.g. shear studs or plastic (elastomer) spacers) and side mould sections. The mould is closed and the polyurethane elastomer core injected into the closed cavity, e.g. via one or more Puromat PU150 high-pressure metering machines in approximately 200 to 400 seconds. The gel and setting is chosen to commence after injection is complete. The section can be removed from the mould within an hour. The use of a mould (jig) ensures that relatively thin folded steel plates are properly placed and supported so that dimensional accuracy is achieved. Drilled bolt holes, final sizing by cold cutting (wedge shaped sections only, if required) and epoxy coat application to the structural steel plate completes the riser section. Shop fabrication and finishing ensures a high quality structural product. Sections can be prefabricated and stored offsite until required. Doubler plates can be welded to the structural plate prior to injection of the core material to decrease localized bearing stresses at the bolted connections which join the riser sections to the raker beams.

The riser sections include appropriate detailing (built in guides with flared edges for alignment, drip lips, caulking joints, lifting attachments) to facilitate lifting, simplify placement and installation. The riser sections, being stiff and relatively light compared to concrete sections, are easily lifted and bolted into place. Riser sections according to the invention may be erected more quickly than concrete risers as they are tougher and not susceptible to chipping and cracking if the section is mishandled during placement. Longitudinal joint sealant is applied and prefabricated stainless steel stair sections are bolted into place. Seating and handrail installation can be completed by methods similar to those used for prestressed concrete risers, e.g. drilling and bolting using for example Hilti (TM) expansion or epoxy bolts or anchors. Speciality attachments and drainage details can be provided as desired.

Figure 6:
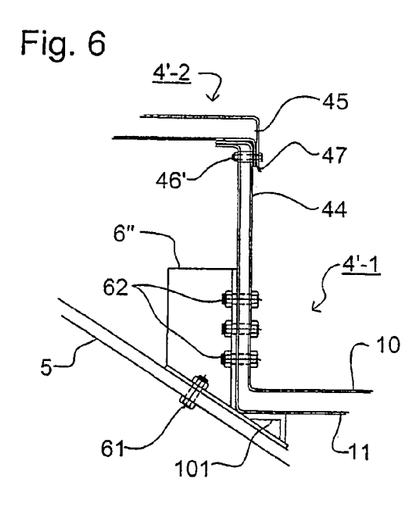
FIG. 6 is a view, similar to FIG. 5 of the seating riser of FIG. 4.

FIG. 4 is an end view of an alternative construction in which the riser 4' is welded to completely encase the plastic core. The upper plate 10' and lower plate 11' are folded to close the long edges, to provide simple weld details and to make matching male and female edges 61, 62 suitable for bolting adjoining riser sections as illustrated in FIG. 6. End plates 100 are cut to shape, fitted and welded at both ends to close the section.

Figure 5:
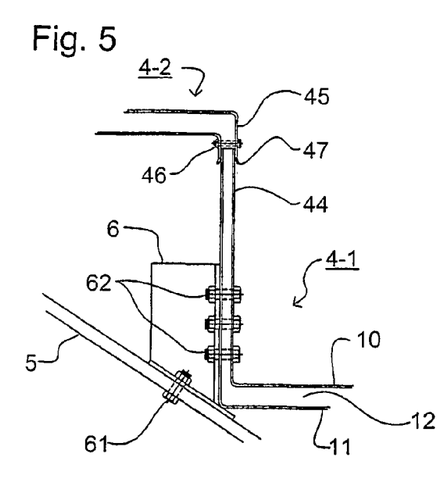
FIG. 5 is a cross-section of part of the seating riser of FIG. 3 illustrating the connection to the upper raker and to an adjoining riser.

FIGS. 5 and 6 show details of the connection between a first riser 4-1 and second riser 4-2 or 4'-2 as well as the mounting of the first riser 4-1 or 4'-1 to the raker beam 5. The second rise 44 of first riser 4-1, 4'-1 engages in the lip section 45 of the upper riser 4-2, 4'-2. The lip section 45 has flared edges 47, acting as drip lips, and, for non-welded constructions, bolts 46 holding the inner and outer plates 10, 11 and core 12 together to prevent delamination in the event of rough handling in transport or misalignment on installation. In the welded embodiment, bolts 46' join the male end 61 of riser 4'-1 to female end 62 of riser 4'-2. To mount each riser to the raker beam 5, T-shaped brackets 6 are provided. These are bolted to the rises 44, 43 of the seat risers 4 and also to the raker beams 5 by bolts 62, 61.

Figure 7:
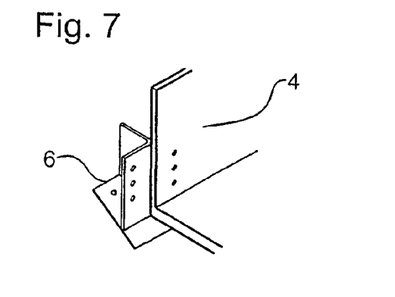
FIG. 7 is an enlarged perspective view of part of the seating riser of FIG. 3 showing how the riser is fixed to a raker bracket.

FIGS. 5 and 6 show the positioning of a T-shaped bracket 6 at the edge of a seat riser so that two longitudinally adjacent risers are bolted to a single bracket 6. The brackets 6 are bolted, as shown in FIG. 7, to the raker beams 5 prior to the placement of the riser sections and act as alignment guides to assist location of the prefabricated risers on installation.

Figure 8:
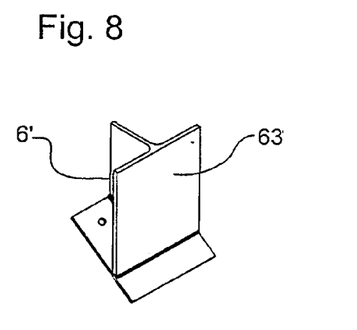
FIGS. 8 and 9 are perspective views of alternative raker brackets.
Figure 9:
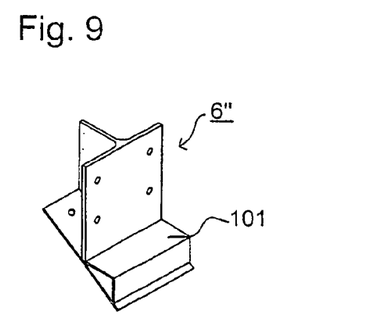
Figure 10:
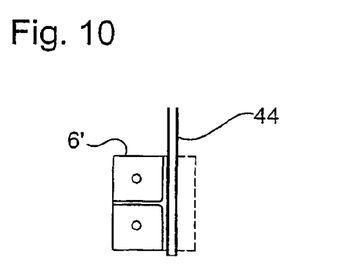
FIG. 10 is a top view of the mounting bracket of FIG. 8 welded to a seating riser according to the invention.

An alternative bracket 6', shown in FIG. 8, has a flat front-face 63 prepared for welding to the back of the rises 43, 44; this is shown in FIG. 10. Another alternative bolted bracket 6" shown in FIG. 9 contains a seating angle 101 to facilitate erection.

Figure 11:
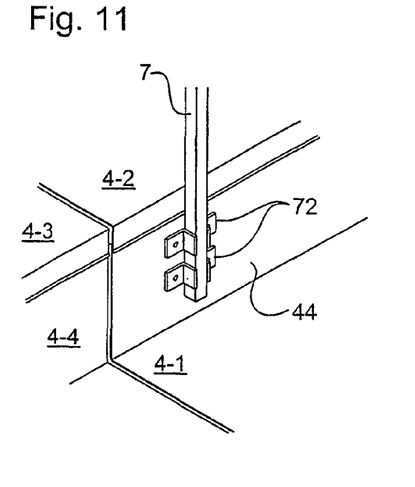
FIG. 11 is a perspective view showing an arrangement for mounting a railing to a seating riser of the present invention.
Figure 12:
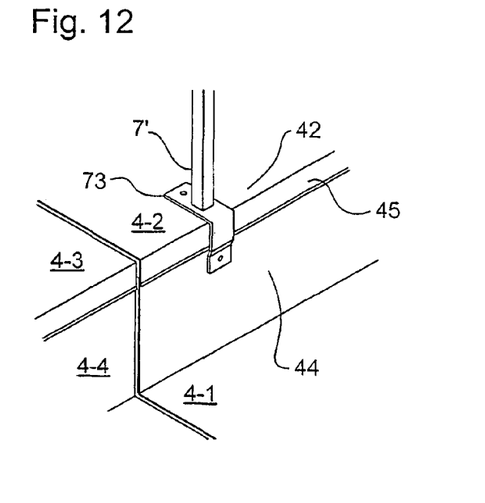
FIG. 12 is a perspective view showing an alternative arrangement for mounting a railing to a seating riser of the present invention.

FIGS. 11 and 12 show alternative arrangements for attachment of railing posts 7, 7'. As shown in FIG. 4, a railing post 7 can be bolted or anchored via bracket 71 to rise 44 of first riser 4-1, near its junction with horizontally and vertically adjacent risers 4-2, 4-3 and 4-4. In FIG. 12, railing post 7' is welded to an L-shaped bracket 73 so that railing post 7' extends upwardly from the lower tread 42 of riser 4-2. The bracket 73 extends over the edge of riser 4-2 and is bent around lip section 45 to be bolted or anchored to upper rise 44 of riser 4-1, in addition to a bolt or anchor connection to lower tread 42 of riser 4-2.

Figure 13:
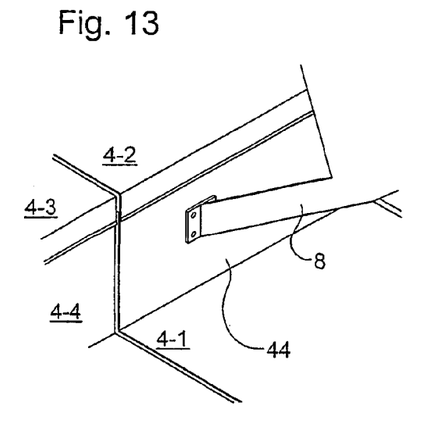
FIG. 13 is a perspective view showing an arrangement for mounting a seat bracket to a seating riser of the present invention.

FIG. 13 shows an arrangement for attaching a seat bracket 8; this can be bolted or anchored to the upper rise 44 of riser 4-1.

Figure 14:
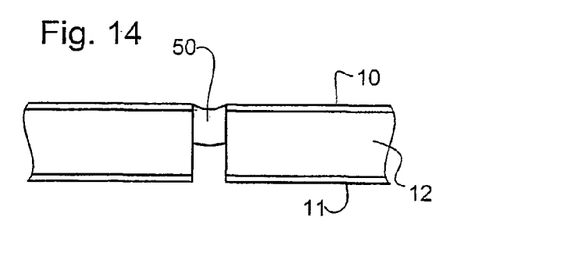
FIG. 14 is a cross-sectional view showing a sealing arrangement between two seating risers according to the present invention.
Figure 15:
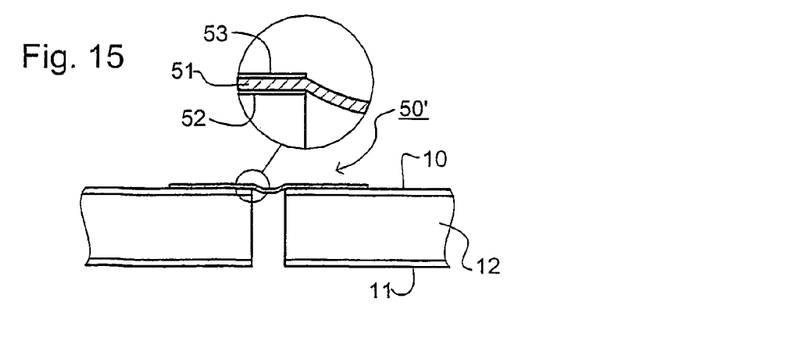
FIG. 15 is a cross-sectional view showing an alternative sealing arrangement between two seating risers according to the present invention.

Two possible longitudinal joint sealant details 50, 50' to prevent water penetration between the ends of two riser sections are illustrated in FIGS. 14 and 15. The first FIG. 14) utilizes caulking 50 (similar to prestressed concrete risers) and the second (FIG. 12) utilizes a flexible membrane 51 or corrugated flexible stainless steel strip that can be bonded to the outer plate 10 of each riser 4 with a two sided structural tape 52 that bonds the strip to the 4 mm stainless steel plate as though it were welded. An additional protective stainless steel sheet 53 can be provided on top of membrane 51 where it is bonded to the riser. The caulking or flexible strip allows expansion or contraction across the joint due to changes in the length of the riser section caused by seasonal temperature changes and can easily be installed once the tier sections are bolted into place.

The two-tier riser of the present invention can withstand critical load combinations comprising one or more of the following: self weight, seating dead load of 0.14 kPa (3 psf), use and occupancy live load of 4.8 kPa uniformly distributed on the horizontally projected surfaces (treads, 100 psf) or applied through the seat brackets, wind load of 1.92 kPa (suction or pressure), snow load of 1.2 kPa and the appropriate railing loads with the appropriate load factors. All bolted and welded connections can conform to CAN/CSA S16.1-94 Limit States Design of Steel Structures. The maximum frequency of vibration for the first three fundamental modes can be limited to 1 Hz. In addition, each tier can be designed to accommodate changes in length due to a temperature fluctuation of +/−40° C., (72° F.). This is achieved by oversized holes for the bolted connections at either end to accommodate changes in length due to temperature changes.

In variations of the present embodiment, the folded plates are placed in a mould (jig) with elastomer spacers and side mould sections. The mould can be constructed to accommodate varying positions of one or both side mould sections to allow variable widths or wedged shape sections to be made. The mould can also provide fixed adjustments to accommodate variable riser heights and tread lengths. Drainage can be easily accomodated by cambering or sloped treads. Slip-resistant wearing surfaces can be incorporated using profiled plates, e.g. of checker board pattern, for upper plate 10.

Wedge shape sections (for use where mitered edges between adjacent rakers are desired, e.g. in flaring seating sections) may be either made to the correct plan dimensions or made square to the longest plan dimension and cut to the correct wedge shape with a fine-tooth band-saw.

Figure 16:
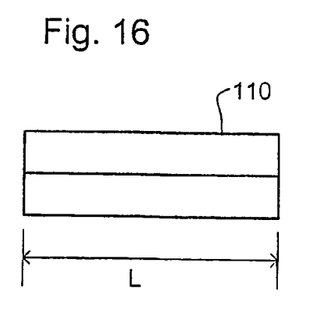
FIGS. 16 to 18 show in plan alternative shapes of riser.
Figure 17:
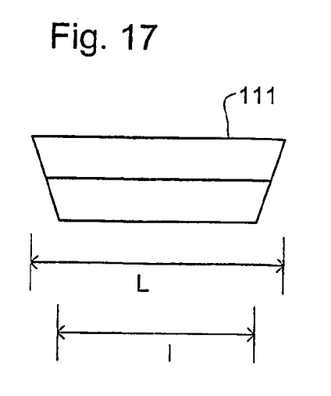
Figure 18:
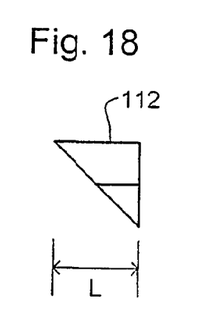

FIGS. 16 to 18 show in plan alternative shapes of riser. The basic form of riser 110, shown in FIG. 16, is rectangular in plan and has a length L in the range of from 6 to 20 m. For curved or polygonal sections of stand a riser 111 of trapezoidal plan as shown in FIG. 17 may be used. In such a riser, the maximum length L may be in the range of 6 to 20 m but the minimum length 1 somewhat less. For corner sections a riser 112 of triangular plan as shown in FIG. 18 may be used. The maximum length L of such a riser may be as small as required. More complex shapes for specific purposes may also be provided.

Figure 19:
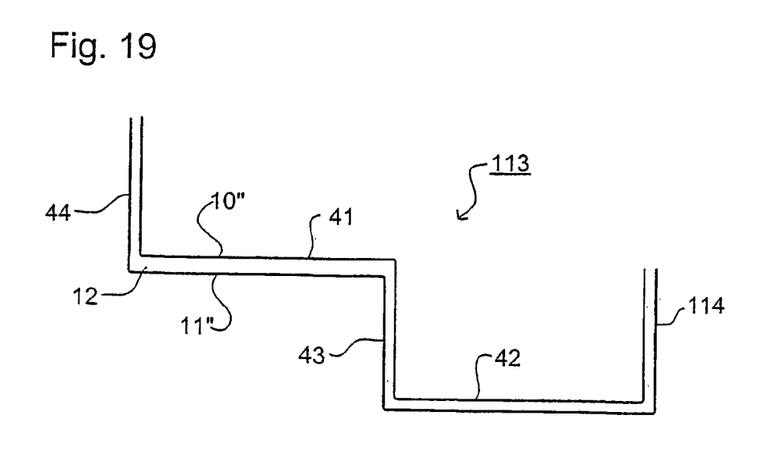
FIG. 19 is a cross-section of an alternative form of riser, according to the invention.

FIG. 19 shows in cross-section an alternative form of riser 113. This riser 113 has an upstanding wall section 114 at the outer edge of the lower tread 42 so that the wall section 114, tread 42 and rise 43 form a "bathtub" section. The wall section 114 forms a perimeter fence when the section is used at the bottom of tiers or sealing sections. The top of the wall section 114 may be angled or curved to prevent spectators resting objects, such as drinks, on it.

Materials

The upper and lower metal plates 10, 11, and other metal parts of the riser section described above, are preferably made of structural steel, as mentioned above, though these may also be made with aluminium, stainless steel, galvanised steel or other structural alloys in applications where lightness, corrosion resistance or other specific properties are essential. The metal should preferably have a minimum yield strength of 240 MPa and an elongation of at least 10%.

The intermediate layer (structural plastic core) should have a modulus of elasticity, E, of at least 250 MPa, preferably 275 MPa, at the maximum expected temperature in the environment in which the member is to be used. In civil applications this may be as high as 100° C.

The ductility of the core material (plastics or polymer) at the lowest operating temperature must be greater than that of the metal layers, which is about 20%. A preferred value for the ductility of the core material at lowest operating temperature is 50%. The thermal coefficient of the core material must also be sufficiently close to that of the steel so that temperature variation across the expected operating range, and during welding, does not cause delamination. The extent by which the thermal coefficients of the two materials can differ will depend in part on the elasticity of the core material but it is believed that the thermal expansion coefficient of the core material may be about 10 times that of the metal layers. The coefficient of thermal expansion may be controlled by the addition of fillers.

The bond strength between the core and metal layers must be at least 0.5, preferably 6, MPa over the entire operating range. This is preferably achieved by the inherent adhesiveness of the core material to metal but additional bond agents may be provided.

The core material is preferably a polyurethane elastomer and may essentially comprise a polyol (e.g. polyester or polyether) together with an isocyanate or a di-isocyanate, a chain extender and a filler. The filler is provided, as necessary, to reduce the thermal coefficient of the intermediate layer, reduce its cost and otherwise control the physical properties of the elastomer. Further additives, e.g. to alter mechanical properties or other characteristics (e.g. adhesion and water or oil resistance), and fire retardants may also be included.

Whilst an embodiment of the invention has been described above, it should be appreciated that this is illustrative and not intended to be limitative of the scope of the invention, as defined in the appended claims. In particular, the dimensions given are intended as guides and not to be prescriptive. Also, the present invention has been exemplified by description of a seating riser but it will be appreciated that the present invention is applicable to other forms of stepped structure.

The invention claimed is:

1. A stepped riser comprising:
   one or more generally horizontal treads; and
   one or more generally vertical rises, each of said treads and rises comprising a sandwich structure having upper and lower metal plates and an intermediate layer of a compact polyurethane material bonded to said metal plates so as to transfer shear forces therebetween,
   wherein each of said treads extends between adjacent rises and comprises said sandwich structure throughout its extent between said adjacent rises, and
   wherein each of said rises extends between adjacent treads and comprises said sandwich structure throughout its extent between said adjacent treads.

2. A stepped riser according to claim 1 wherein said riser is a seating riser.

3. A stepped riser according to claim 2 further comprising mounting details for at least one seat and/or railings.

4. A stepped riser according to any one of claims 1 to 3 wherein said riser has a maximum length of from 6 to 20 m.

5. A stepped riser according to any one of claims 1 to 3 wherein said stepped riser has a run of from 600 to 1200 mm.

6. A stepped riser according to any one of claims 1 to 3 wherein said upper and lower metal plates are formed by folding or roll-forming respective flat plates.

7. A stepped riser according to any one of claims 1 to 3 wherein said intermediate layer is thicker in treads of said stepped riser than in rises.

8. A stepped riser according to claim 1 wherein one of said rises joins the front edge of an upper one of said treads to the rear edge of a lower one of said treads and a said second rise extends upwardly from the rear edge of said upper tread, the front edge of said lower tread having a downwardly projection lip portion.

9. A stepped riser according to claim 8 wherein said upper and lower plates are flared in said lip portion to receive an upper edge of an upper rise of a like stepped riser.

10. A stepped riser according to any one of claims 1 to 3 wherein said upper plate is made of a different metal or alloy than said lower plate.

11. A stepped riser according to claim 10 wherein said upper plate is more corrosion resistant than said lower plate.

12. A stepped riser according to any one of claims 1 to 3 wherein said upper plate is thinner than said lower plate.

13. A stepped riser according to any one of claims 1 to 3 wherein said upper plate is provided with a corrosion prevention treatment.

14. A stepped riser according to any one of claims 1 to 3 wherein said upper plate has a thickness in the range of from 2 to 10 mm, said lower plate has a thickness in the range of from 2 to 10 mm and said intermediate layer has a thickness in the range of from 10 to 100 mm.

15. A spectator stand having at least one stepped riser according to any one of claims 1 to 3.

* * * * *

UNITED STATES PATENT AND TRADEMARK OFFICE
CERTIFICATE OF CORRECTION

PATENT NO.        : 7,047,699 B2                                         Page 1 of 1
APPLICATION NO.   : 10/398643
DATED             : May 23, 2006
INVENTOR(S)       : Kennedy et al.

It is certified that error appears in the above-identified patent and that said Letters Patent is hereby corrected as shown below:

On title page (item 75) Inventors:

Please delete "Stephen J. Kennedy, Canada (CA)" and substitute – Stephen J. Kennedy, Ontario (CA)

On title page (item 30)

Please insert Priority Information as follow:

GB 0025444.1   October 17, 2000

Signed and Sealed this

Eighth Day of August, 2006

JON W. DUDAS
*Director of the United States Patent and Trademark Office*